US008441681B2

(12) United States Patent
Goto et al.

(10) Patent No.: US 8,441,681 B2
(45) Date of Patent: May 14, 2013

(54) PRINTING APPARATUS FOR PRINTING COMPOSITE IMAGE, PRINT DATA GENERATING APPARATUS FOR GENERATING PRINT DATA OF COMPOSITE IMAGE, AND PRINT DATA GENERATING PROGRAM FOR GENERATING PRINT DATA OF COMPOSITE IMAGE

(75) Inventors: Kazuma Goto, Nagoya (JP); Atsushi Nakamura, Nagoya (JP); Yuichi Ito, Mie-ken (JP); Narumi Kawai, Nagoya (JP); Masayuki Takata, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 484 days.

(21) Appl. No.: 12/731,511

(22) Filed: Mar. 25, 2010

(65) Prior Publication Data

US 2011/0026043 A1 Feb. 3, 2011

(30) Foreign Application Priority Data

Jul. 31, 2009 (JP) ................................. 2009-178847

(51) Int. Cl.
*G06F 15/00* (2006.01)
*G06K 1/00* (2006.01)
(52) U.S. Cl.
USPC .............. 358/1.9; 358/1.2; 358/2.1; 358/3.26
(58) Field of Classification Search ................... 358/1.9, 358/1.2, 2.1, 3.26
See application file for complete search history.

(56) References Cited

U.S. PATENT DOCUMENTS

| 7,315,386 | B1 * | 1/2008 | Shiimori et al. | 358/1.15 |
| 7,408,672 | B2 * | 8/2008 | Ito | 358/1.2 |
| 2002/0093671 | A1 * | 7/2002 | Ohno | 358/1.9 |
| 2005/0206731 | A1 * | 9/2005 | Ogasawara et al. | 348/180 |
| 2005/0206734 | A1 * | 9/2005 | Kubo et al. | 348/207.1 |

FOREIGN PATENT DOCUMENTS

| JP | 2001-195213 | 7/2001 |
| JP | 2008-92393 | 4/2008 |

* cited by examiner

*Primary Examiner* — Dennis Dicker
(74) *Attorney, Agent, or Firm* — Scully, Scott, Murphy & Presser, PC

(57) ABSTRACT

A printing apparatus, which prints a composite image formed of an enlargement portion and a non-enlargement portion of an original image on a printing medium, includes: an enlargement portion determining section which determines the enlargement portion, of the original image, which is to be enlarged in the composite image; an enlargement rate determining section which determines an enlargement rate of the enlargement portion with respect to the original image; a print data generating section which generates print data for printing the composite image based on image data of the original image, the enlargement portion determined by the enlargement portion determining section, and the enlargement rate determined by the enlargement rate determining section; and a printing mechanism which prints the composite image on the printing medium based on the print data generated by the print data generating section.

4 Claims, 11 Drawing Sheets

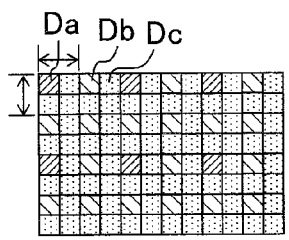
Fig. 6A
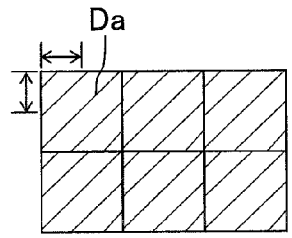
Fig. 6B
Fig. 6C
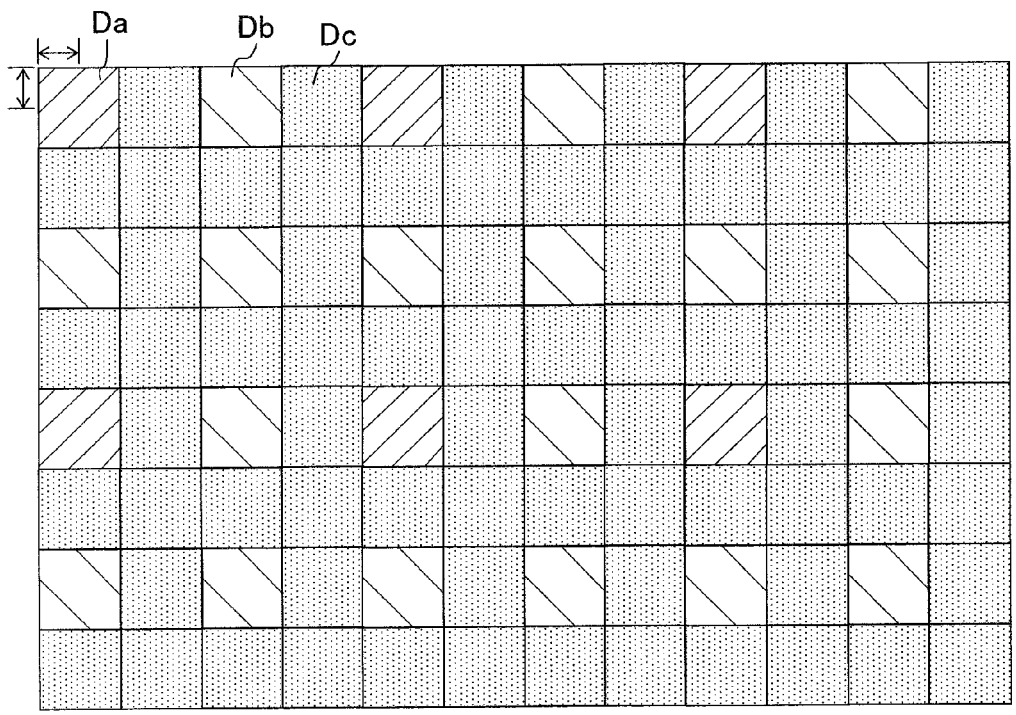

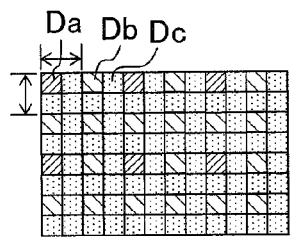
Fig. 8A
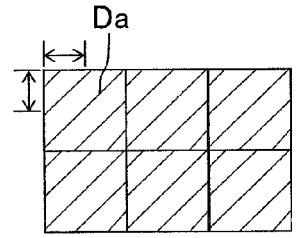
Fig. 8B
Fig. 8C
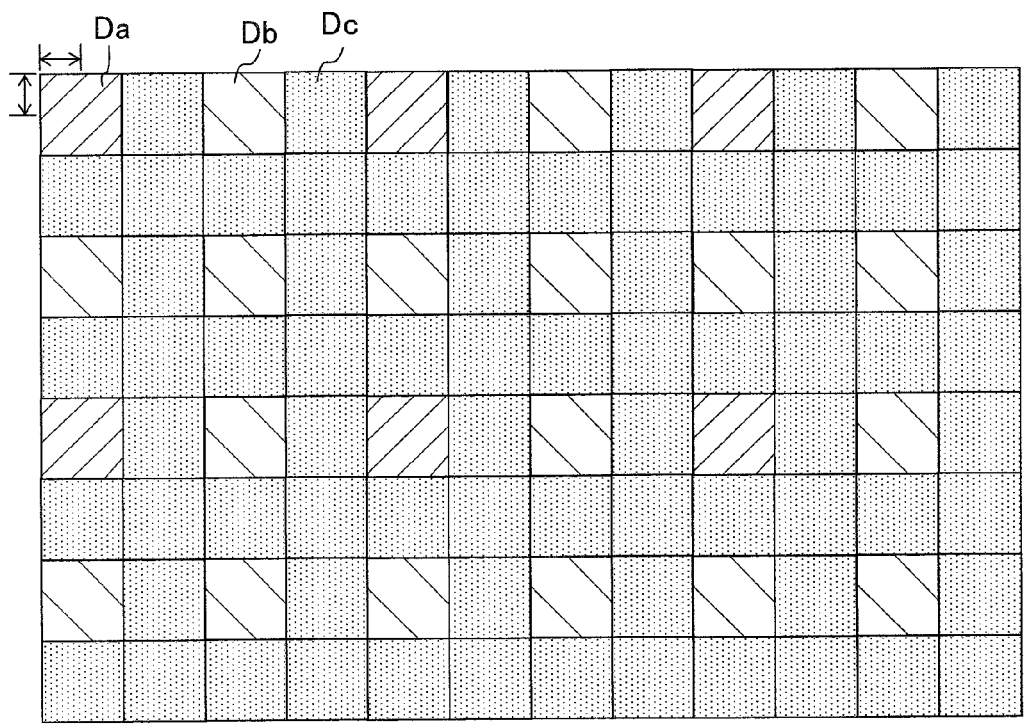

PRINTING APPARATUS FOR PRINTING COMPOSITE IMAGE, PRINT DATA GENERATING APPARATUS FOR GENERATING PRINT DATA OF COMPOSITE IMAGE, AND PRINT DATA GENERATING PROGRAM FOR GENERATING PRINT DATA OF COMPOSITE IMAGE

CROSS REFERENCE TO RELATED APPLICATION

The present application claims priority from Japanese Patent Application No. 2009-178847, filed on Jul. 31, 2009, the disclosure of which is incorporated herein by reference in its entirety.

BACKGROUND OF THE INVENTION

1. Field of the Invention

The present invention relates to a printing apparatus printing a composite image obtained by synthesizing an enlargement portion obtained by enlarging one portion of an original image and a non-enlargement portion, a print data generating apparatus and a print data generating program that generate print data for printing the composite image as above.

2. Description of the Related Art

In a printing system disclosed in Japanese Patent Application Laid-open No. 2008-92393, when a user surrounds, of a sample image printed on an order sheet, a region to be enlarged that is desired to be enlarged by a marker, and checks check columns for designating an enlargement rate and a placement of the region to be enlarged, and then causes a scanner to read the order sheet, in a printing apparatus, an image where only a portion to be enlarged is enlarged on the sample image, namely, a composite image obtained by synthesizing the portion to be enlarged that is enlarged (an enlargement portion) and a portion except the above (non-enlargement portion) is printed.

Further, in a printing system disclosed in Japanese Patent Application Laid-open No. 2001-195213, in a printer driver, thinning-out processing in which data of some pixels are thinned out from image data of an original image at a predetermined thinning-out rate is performed, and thereby print image data whose data amount is smaller than that of the image data of the original image is generated, and the above print image data is transferred to a printer, and thereby printing is performed. Accordingly, when printing is performed at a resolution lower than that of the data of the original image, or the like, the print image data obtained by thinning out data of pixels that are not used for printing from the data of the original image is transferred to the printer, and thus processing can be speeded up.

Here, in the case when by using the printing system in which printing is performed by data obtained by thinning out part of image data of an original image as disclosed in Japanese Patent Application Laid-open No. 2001-195213, a composite image obtained by synthesizing an enlargement portion obtained by enlarging one portion of the original image and a non-enlargement portion is printed as disclosed in Japanese Patent Application Laid-open No. 2008-92393, when in both the enlargement portion and the non-enlargement portion, print image data are generated by thinning out the data of the original image at the same thinning-out rate and the composite image is printed based on the generated print image data, a resolution in the enlargement portion becomes lower than that in the non-enlargement portion because the enlargement portion is enlarged. As a result, in the printed composite image, difference in image quality occurs between the enlargement portion and the non-enlargement portion.

SUMMARY OF THE INVENTION

An object of the present invention is to provide a printing apparatus capable of printing a composite image obtained by synthesizing an enlargement portion and a non-enlargement portion so that difference in resolution between the enlargement portion obtained by enlarging one portion of an original image and the non-enlargement portion is reduced, a print data generating apparatus and a print data generating program that generate print data for printing the composite image as above.

According to a first aspect of the present invention, there is provided a printing apparatus which prints a composite image formed of an enlargement portion and a non-enlargement portion of an original image on a printing medium, the printing apparatus including: an enlargement portion determining section which determines the enlargement portion, of the original image, which is to be enlarged in the composite image; an enlargement rate determining section which determines an enlargement rate of the enlargement portion with respect to the original image; a print data generating section which generates print data for printing the composite image based on image data of the original image, the enlargement portion determined by the enlargement portion determining section, and the enlargement rate determined by the enlargement rate determining section; and a printing mechanism which prints the composite image on the printing medium based on the print data generated by the print data generating section, and the print data generating section thins out the number of pixels of the non-enlargement portion based on a first thinning-out rate and thins out the number of pixels of the enlargement portion based on a second thinning-out rate which is smaller than the first thinning-out rate to generate the print data.

According to the above, in the non-enlargement portion, the print data is generated by thinning out the pixels in the image data of the original image at a predetermined thinning-out rate, and in the enlargement portion, the print data is generated by thinning out the pixels in the image data of the original image at a thinning-out rate smaller than the above-described predetermined thinning-out rate, and thereby the difference in resolution between the enlargement portion and the non-enlargement portion can be thinned out.

Note that in processing in which the pixels in the image data of the original image are thinned out at a thinning-out rate smaller than the predetermined thinning-out rate, processing in which the pixels in the image data of the original image are not thinned out, (where a thinning-out rate is 0%), is also included.

According to a second aspect of the present invention, there is provided a print data generating apparatus which generates print data of a composite image formed of an enlargement portion and a non-enlargement portion of an original image to be printed on a printing medium, the apparatus including: an enlargement portion determining section which determines the enlargement portion, of the original image, which is to be enlarged in the composite image; an enlargement rate determining section which determines an enlargement rate of the enlargement portion with respect to the original image; a print data generating section which generates print data for printing the composite image based on image data of the original image, the enlargement portion determined by the enlargement portion determining section, and the enlargement rate determined by the enlargement rate determining section, wherein the print data generating section generates the print data by thinning out the number of pixels of the non-enlargement portion based on a first thinning-out rate and by thinning out the number of pixels of the enlargement portion based on a second thinning-out rate which is smaller than the first thinning-out rate.

According to a third aspect of the present invention, there is provided a print data generating program for generating print data of a composite image formed of an enlargement portion and a non-enlargement portion of an original image to be printed on a printing medium, the program including: an enlargement portion determining step for determining an enlargement portion, of the original image, which is to be enlarged in the composite image; an enlargement rate determining step for determining an enlargement rate of the enlargement portion with respect to the original image; and a print data generating step for generating print data for printing the composite image based on image data of the original image, the enlargement portion determined in the enlargement portion determining step, and the enlargement rate determined in the enlargement rate determining step, and in the print data generating step, the print data is generated by thinning out the number of pixels of the non-enlargement portion based on a first thinning-out rate and by thinning out the number of pixels of the enlargement portion based on a second thinning-out rate which is smaller than the first thinning-out rate.

According to the present invention, since as for the enlargement portion, the print data is generated by thinning out the pixels in the image data of the original image at the second thinning-out rate smaller than the first thinning-out rate in the non-enlargement portion, it is possible to reduce the difference in resolution between the enlargement portion and the non-enlargement portion.

BRIEF DESCRIPTION OF THE DRAWINGS

FIG. 1A shows a state where a cover is closed and FIG. 1B shows a state where the cover is open;

FIG. 6A to FIG. 6C are views showing one example of a way to thin out pixels in the case when printing is performed at a resolution corresponding to a half of that in the image data of the original image and the enlargement rate is 400%;

FIG. 8A to FIG. 8C are views showing one example of a way to thin out pixels in the case when printing is performed at a resolution corresponding to a quarter of that in the image data of the original image and the enlargement rate is 400%;

DETAILED DESCRIPTION OF THE PREFERRED EMBODIMENTS

Hereinafter, a preferred embodiment of the present invention will be explained.

Figure 1A:
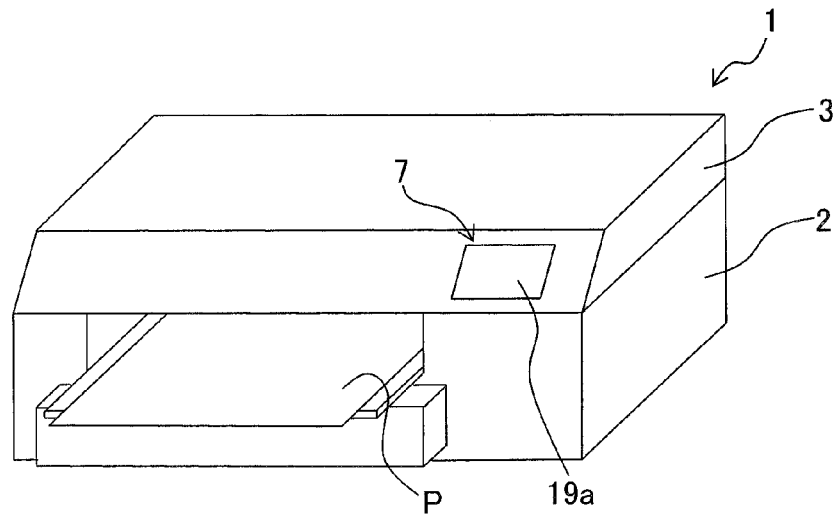
FIG. 1A and FIG. 1B are schematic structural views of a printer according to an embodiment in the present invention.
Figure 1B:
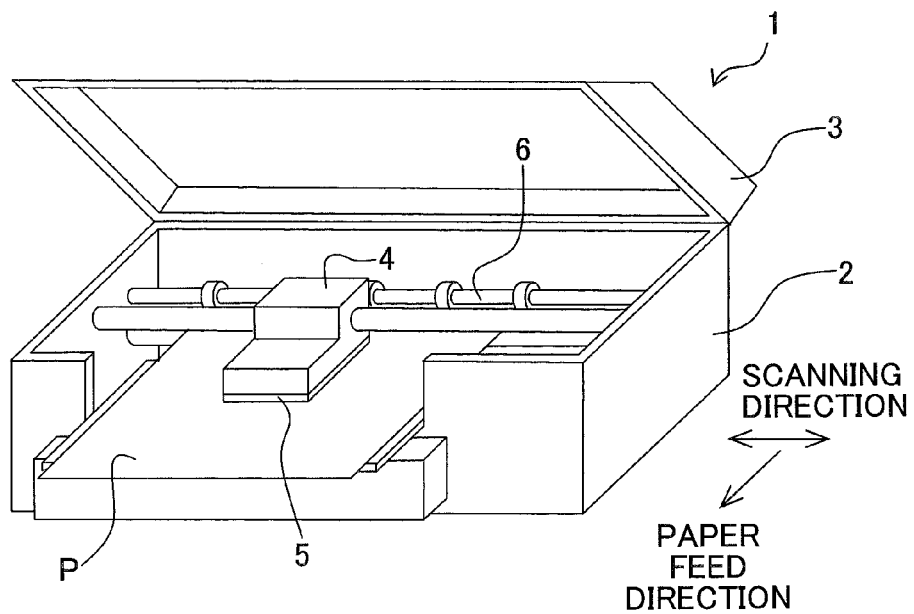

As shown in FIG. 1A and FIG. 1B, a printer 1 includes a main body case 2, a cover 3, a carriage 4, an ink-jet head 5, a paper feed roller 6, a touch panel 7, and so on. Further, operations of the printer 1 are controlled in a later-described control device 40 (see FIG. 3).

The main body case 2 is a case in a substantially rectangular parallelepiped shape whose upper surface is open. The cover 3 is to cover the opening of the upper surface of the main body case 2. Then, the printer 1 is normally used with the cover 3 closed, and maintenance and the like for the ink-jet head 5 can be performed when the cover 3 is open.

The carriage 4 is disposed inside the main body case 2 and reciprocates in a scanning direction (right and left direction in FIGS. 1A and 1B). The ink-jet head 5 is attached to a lower surface of the carriage 4, and jets ink from a plurality of nozzles that are not shown and formed on a lower surface of the ink-jet head 5. The paper feed roller 6 is disposed inside the main body case 2 and conveys recording paper P in a paper feed direction (near side direction in FIGS. 1A and 1B).

Then, in the printer 1, printing on the recording paper P (a printing medium) is performed in such a manner that the ink is jetted from the ink-jet head 5 that reciprocates with the carriage 4 in the scanning direction to the recording paper P conveyed by the paper feed roller 6.

The touch panel 7 is disposed on a front surface of the cover 3 on the near side in FIGS. 1A and 1B. The touch panel 7 includes a display screen 19a exposed on the above-described front surface of the cover 3, and on the display screen 19a, a display 19 (see FIG. 3) where an image to be printed in the printer 1, buttons for operating the printer 1, and so on are displayed and a detecting sensor 18 (see FIG. 3) detecting a position touched by a user when the user touches the display screen 19a with his/her finger, a dedicated pen or the like are provided. Note that a constitution of the touch panel 7 is similar to that of a conventional one, and thus a detailed explanation thereof is omitted here.

Figure 2:
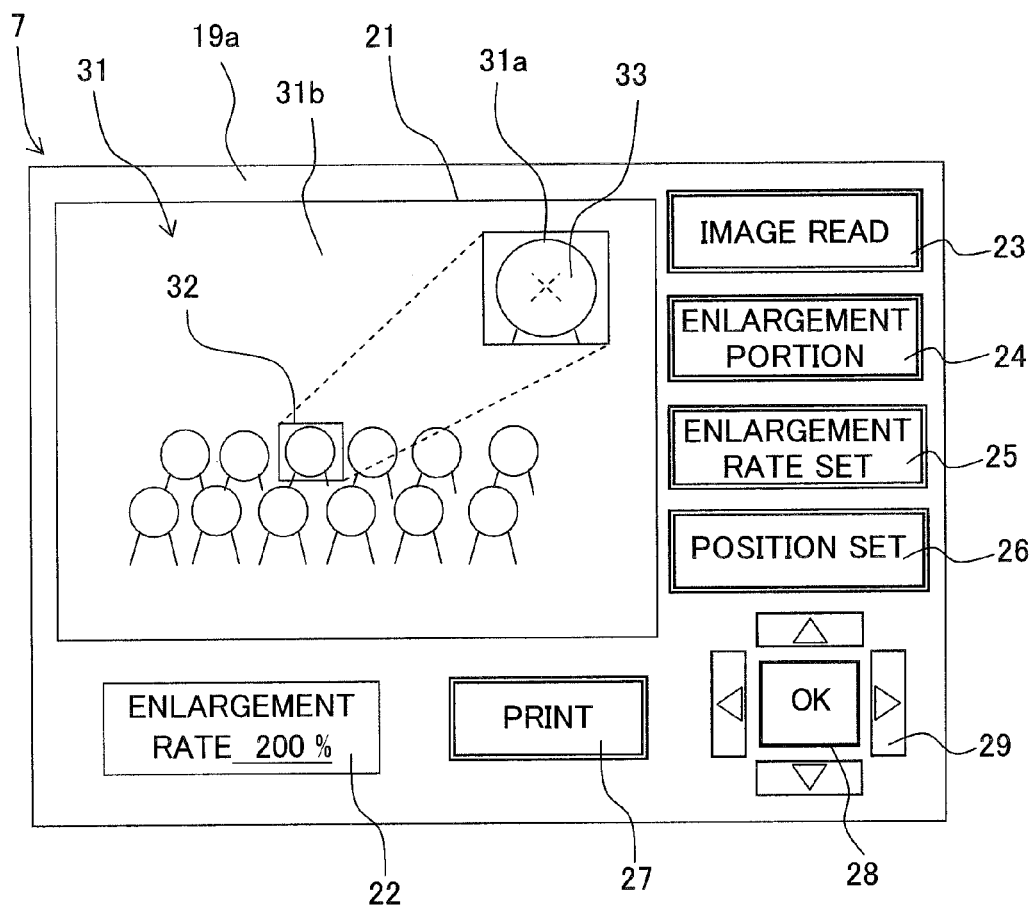
FIG. 2 is a view showing an image to be displayed on a display screen of a touch panel in FIG. 1A.

As shown in FIG. 2, on the display screen 19a, a print image display portion 21, an enlargement rate display portion 22, an image read button 23, an enlargement portion set button 24, an enlargement rate set button 25, an enlargement portion position set button 26, a print button 27, a determination button 28, four direction buttons 29, and so on are displayed.

The print image display portion 21 is a substantially rectangular portion placed in a region extending continuously from a left upper end portion to a substantially center portion of the display screen 19a, on which an image to be printed in the printer 1 is displayed. Image data of an image which is recorded by, for example, a digital camera is stored in a recording medium such as a memory card typically in a state of being compressed in such a format as joint photographic experts group (JPEG). When the recording medium is inserted into the printer 1 via slot (not shown), the compressed image data is extracted, and bitmap data of the image having the number of pixels determined by the digital camera and thumbnail image data are obtained. The thumbnail image data is used for displaying an image on the print image display portion 21. On the other hand, as described later, the bitmap data of the image is used for generating a print image to be printed on a printing sheet. Here, the printer 1 in addition to normal printing in which a read image is printed as it is, can print a composite image obtained by synthesizing an enlargement portion 31a obtained by enlarging one portion of an original image, (which is a portion surrounded by a frame 32 in the drawing), in the original image, namely, a composite image 31 obtained by synthesizing the enlargement portion 31a and a non-enlargement portion 31b being a portion that is not enlarged except the above. FIG. 2 shows a state where the composite image 31 is displayed on the print image display portion 21.

Incidentally, as a concrete example where the composite image 31 as above is printed, printing a composite image obtained after in a group photograph, an enlarged photograph of a specified person of the group photograph is synthesized, printing a composite image obtained after in an image of an entire apparatus, an enlarged image of a specified portion of the apparatus is synthesized, or the like can be cited.

The enlargement rate display portion 22 is placed at a left lower end portion of the display screen 19a, on which an enlargement rate of the enlargement portion 31a, (which is, for example, 200%, or the like) is displayed.

The image read button 23, the enlargement portion set button 24, the enlargement rate set button 25, the enlargement portion position set button 26, the print button 27, the determination button 28, and the four direction buttons 29 are buttons displayed on the display screen 19a, and these buttons are touched with a finger, a dedicated pen, or the like to be operated, thereby enabling actions corresponding to the operations of the respective buttons to be executed as will be explained below. Note that these buttons 23 to 29 are not limited to be displayed on the display screen 19a of the touch panel 7 and they may also be disposed outside the touch panel 7 as actual buttons.

The image read button 23 is placed at a right upper end portion of the display screen 19a. When the image read button 23 is operated, a pop-up window in which, for example, image data are list-displayed is displayed on the display screen 19a and the display screen 19a is brought into a state that image data of an original image to be a base of the composite image 31 can be selected.

The enlargement portion set button 24 is placed below the image read button 23. When the enlargement portion set button 24 is operated, the display screen 19a is brought into a state that inputs of setting and changing of a range to be the enlargement portion 31a (a range surrounded by the frame 21, or an enlargement portion) in an image displayed on the display screen 19a can be made.

The enlargement rate set button 25 is placed below the enlargement portion set button 24. When the enlargement rate set button 25 is operated, the display screen 19a is brought into a state that inputs of setting and changing of an enlargement rate displayed on the enlargement rate display portion 22 can be made.

The enlargement portion position set button 26 is placed below the enlargement rate set button 25. When the enlargement portion position set button 26 is operated, the display screen 19a is brought into a state that inputs of setting and changing of a position of a marker 33 displayed on the print image display portion 21 for specifying a position at which the enlargement portion 31a is placed, (which is a center position, for example), can be made.

The print button 27 is placed to the right of the enlargement rate display portion 22. When the print button 27 is operated, an image displayed on the print image display portion 21 is printed in the printer 1.

The determination button 28 is placed at a right lower end portion of the display screen 19a. The determination button 28 is operated, and thereby it is possible to determine the selection of image data, the change of an enlarged region, the change of an enlargement rate, and the setting and changing of a position where an enlargement portion is placed, which are described above, or the like.

The four direction buttons 29 are placed above, below, to the left of, and to the right of the determination button 28 respectively. The direction buttons 29 are operated in a state where the input of the selection of image data, and the inputs of the setting and changing of an enlargement portion, an enlargement rate, and a position where an enlargement portion is placed can be made as described above, thereby enabling these changes to be performed.

Next, the control device 40 controlling the printer 1 will be explained.

Figure 3:
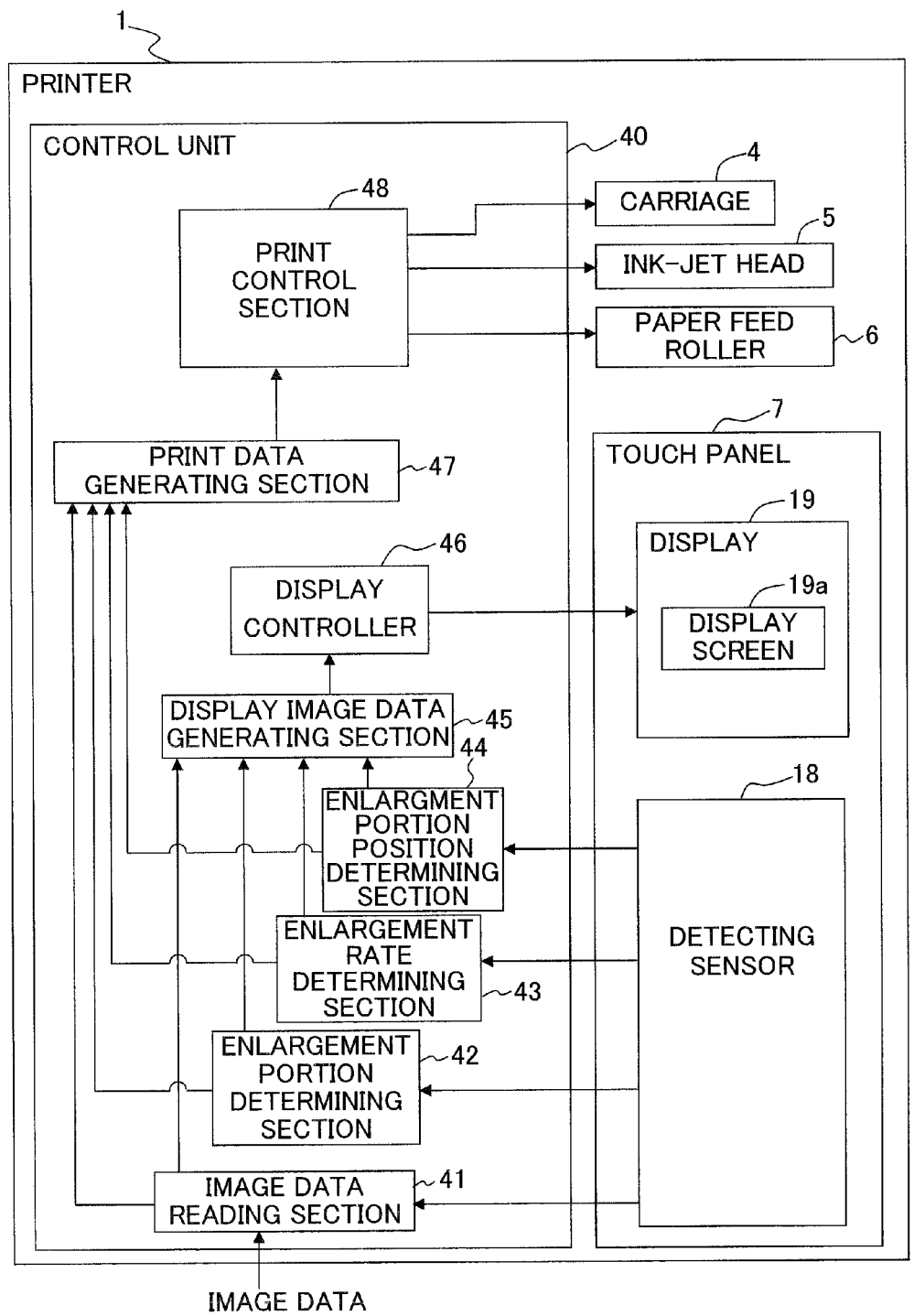
FIG. 3 is a functional block diagram showing a configuration of a control device controlling the printer in FIG. 1A and FIG. 1B.

The control device 40 is configured by a CPU (Central Processing Section), a ROM (Read Only Memory), a RAM (Random Access Memory), and so on, and these function as an image data reading section 41, an enlargement portion determining section 42, an enlargement rate determining section 43, an enlargement portion position determining section 44, a display image data generating section 45, a display control section 46, a print data generating section 47, a print control section 48, and so on as shown in FIG. 3.

The image data reading section 41 reads data of an original image to be a base of an image to be printed. Concretely, for example, when the direction buttons 29 are operated while the above-described pop-up window where image data are list-displayed is displayed by the operation of the image read button 23, image data being selected on the pop-up window is switched. Then, when the determination button 28 is operated, the image data being selected is determined as data of an original image, and the corresponding image data is read from a not-shown memory card inserted into the printer 1 or the like.

The enlargement portion determining section 42 determines, of the original image, a range to be the enlargement portion 31a (a range surrounded by the frame 32, or an enlargement portion) in accordance with the operations of the determination button 28 and the direction buttons 29 detected by the detecting sensor 18 in a state where the above-described enlargement portion set button 24 is operated and thereby the inputs of setting and changing of a range to be the enlargement portion 31a can be made. Concretely, for example, when a range of the frame 32 is stored in the RAM or the like in the control device 40 and the direction buttons 29 are operated, a position and a size of the frame 32 are changed in accordance with the operation. Then, when the determination button 28 is operated, the stored range of the frame 32 is determined as a range to be the enlargement portion 31a.

The enlargement rate determining section 43 determines an enlargement rate in accordance with the operations of the determination button 28 and the direction buttons 29 detected by the detecting sensor 18 in a state where the above-described enlargement rate set button 24 is operated and thereby the inputs of setting and changing of an enlargement rate can be made. Concretely, for example, when an enlargement rate is stored in the RAM or the like in the control device 40 and the direction buttons 29 are operated, the stored enlargement rate is increased or decreased in accordance with the operation. Then, when the determination button 28 is operated, the stored enlargement rate is determined as an enlargement rate of the enlargement portion 31a.

The enlargement portion position determining section 44 determines a position where the enlargement portion 31a is placed in accordance with the operations of the determination button 28 and the direction buttons 29 detected by the detecting sensor 18 in a state where the above-described enlargement portion position set button 26 is operated and thereby the inputs of setting and changing of a position where the enlargement portion 31a is placed can be made. Concretely, for example, when a position of the marker 33 is stored in the RAM or the like in the control device 40 and the direction buttons 29 are operated, the stored position of the marker 33 is changed in accordance with the operation. Then, when the determination button 28 is operated, the stored position of the marker 33 is determined as a position where the enlargement portion 31a is placed, (which is a center position, for example).

Incidentally, in this embodiment, as described above, the enlargement portion position set button 26 and the enlargement portion position determining section 44 are provided, and this embodiment is constituted in a manner that the position of the marker 33 is set, thereby enabling the position where the enlargement portion 31a is placed to be set without restraint, but the present invention is not limited to the above. The present invention may also be constituted in a manner that the enlargement portion 31a is always placed at a specified position of the composite image 31, which is, for example, a right upper end portion of the composite image 31 or the like.

The display image data generating section 45 generates image data of a display image to be displayed on the display screen 19a. Concretely, the display image data generating section 45 generates image data of an image combined with the original image corresponding to the image data read in the image data reading section 41, the frame 32 placed at the position determined in the enlargement portion determining section 42, the marker 33 placed at the position determined in the enlargement portion position determining section 44, and an image of the enlargement portion 31a obtained by enlarging an inside portion surrounded by the frame 32 of the original image at the enlargement rate determined in the enlargement rate determining section 43, which is placed at the position of the marker 33. Further, the display image data generating section 45 also generates image data of images of the enlargement rate display portion 22 and the operation buttons 23 to 28. The display control section 46 controls the display 19 so that the images corresponding to the image data generated in the display image data generating section 45 are displayed on the display screen 19a.

The print data generating section 47 generates print data for performing printing based on the data of the original image read in the image data reading section 41, the range of the frame 32 determined in the enlargement portion determining section 42, the enlargement rate determined in the enlargement rate determining section 43, and the position of the marker 33 determined in the enlargement portion position determining section 44. At this time, the print data generating section 47, in accordance with a resolution of an image to be printed, thins out some of pixels in the image data of the original image that are not used for printing to generate the print data. Accordingly, a data amount of the print data to be transferred from the print data generating section 47 to the print control section 48 is reduced compared with that of the image data of the original image, and thus transfer processing of the print data, printing processing in the print control section 48 and the like can be performed at high speed. Note that the print data to be generated in the print data generating section 47 will be explained in detail later.

The print control section 48 controls the carriage 4, the ink-jet head 5, and the paper feed roller 6 to cause the printer 1 to print an image corresponding to the print data generated in the print data generating section 47. Note that in this embodiment, the combination of the carriage 4, the ink-jet head 5, the paper feed roller 6, and the print control section 48 controlling these corresponds to a printing mechanism according to the present invention.

Next, a procedure to perform printing by using the bitmap data of the image which is stored in the printer 1 will be explained.

Figure 4A:
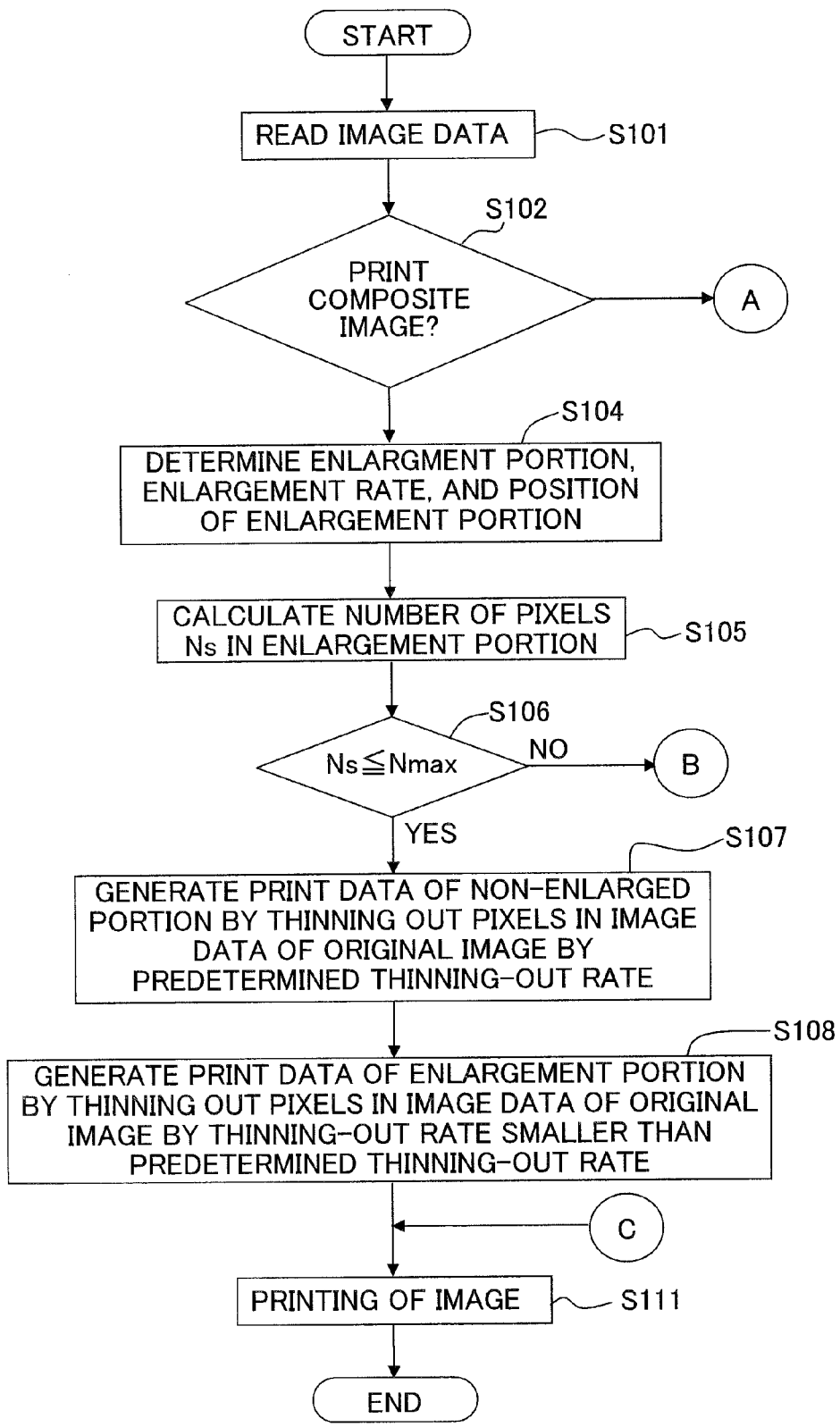
FIG. 4A and FIG. 4B are views showing a procedure to print a composite image in the printer in FIG. 1A and FIG. 1B.
Figure 4B:
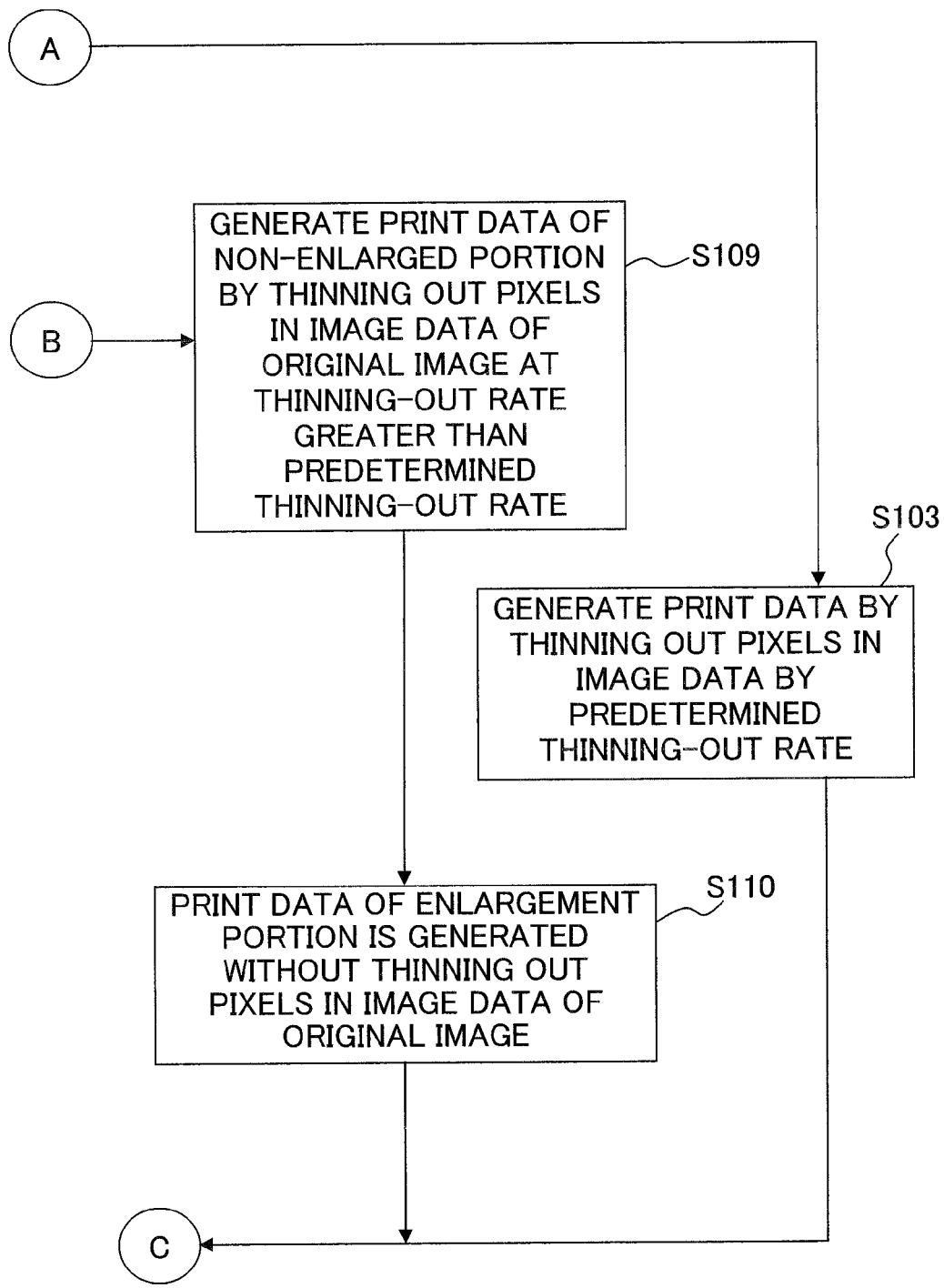

As shown in FIG. 4, first, bitmap data of an image is read in the image data reading section 41 in order to perform printing in the printer 1 (Step S101, which will be simply denoted as S101 and the like, hereinafter).

Then, when normal printing, in which not the composite image 31 but the read image is printed as it is, is performed (S102: NO), the print data generating section 47 thins out pixels in the read image data to fit the size of a recording sheet based on a predetermined thinning-out rate R (S103). Here, the thinning-out rate R indicates a ratio of the number of thinned out pixels to the number of pixels before thinning out. In particular, the number of pixels of an image to be printed by the printer 1 is calculated by multiplying the number of pixels of an original image by a value which is obtained by subtracting the predetermined thinning-out ratio R from 1.

Then, the print control section 48 controls the carriage 4, the ink-jet head 5, and the paper feed roller 6 to print the image based on the generated print data (S111).

On the other hand, when the composite image 31 is printed (S102: YES), by the operations of the above-described buttons 23 to 28 or the like, the range of the portion to be the enlargement portion 31a, (the range surrounded by the frame 32), the enlargement rate, and the position at which the enlargement portion 31a is placed, (which is the position of the marker 33), are determined (S104).

Next, the print data generating section 47 calculates the number of pixels Ns of the enlargement portion 31a in printing image data (S105). Providing the number of pixels, of a portion corresponding to the enlargement portion 31a in the image data of the original image, is Nmax, the predetermined thinning-out rate is Rt, and the enlargement rate is Re, the number of pixels Ns of the enlargement portion 31a in the printing image data is calculated by the following expression.

$$Ns = Nmax \times (1-Rt) \times (Re)^2$$

Subsequently, when the number of pixels Ns of the enlargement portion 31a calculated at S105 is not more than the number of pixels Nmax of the portion corresponding to the enlargement portion 31a in the image data of the original image (S106: YES), the print data generating section 47 thins out the pixels in the image data of the original image based on a predetermined thinning-out rate (based on a first thinning-out rate) similar to that of the case when the above-described normal printing is performed, to generate the print data of the non-enlargement portion 31b (S107). Further, the print data generating section 47 thins out the pixels in the image data of the original image based on a thinning-out rate smaller than the predetermined thinning-out rate (based on a second thinning-out rate) to generate the print data of the enlargement portion 31a (S108). At this time, the print data generating section 47 uses smaller thinning-out rate as the enlargement rate of the enlargement portion 31a is larger.

Then, the print control section 48 controls the carriage 4, the ink-jet head 5, and the paper feed roller 6 to print the composite image 31 based on the generated print data of the enlargement portion 31a and the non-enlargement portion 31b (S111).

On the other hand, when the calculated number of pixels Ns of the enlargement portion 31a is greater than the number of pixels Nmax (S106: NO), the print data generating section 47 thins out the pixels in the image data of the original image based on a thinning-out rate greater than the above-described predetermined thinning-out rate (based on a first thinning-out rate), to generate the print data of the non-enlargement portion 31b (S109). Further, the print data generating section 47 does not thin out the pixels in the image data of the original image, in other words, thins out the pixels in the image data of the original image based on a thinning-out rate, which is 0%, smaller than the predetermined thinning-out rate (based on a second thinning-out rate) to generate the print data of the enlargement portion 31a (S110).

Then, the print control section 48 controls the carriage 4, the ink-jet head 5, and the paper feed roller 6 to print the composite image 31 based on the generated print data of the enlargement portion 31a and the non-enlargement portion 31b (S111).

Next, concrete examples at Steps S103, S105, and S107 to S110 that are described above will be explained. Note that in the following, the case in which printing is performed at a resolution corresponding to a half or a quarter of that in the image data of the original image and the enlargement rate Re of the enlargement portion 31a is 200% (double) or 400% (quadruple) will be explained as concrete examples.

Figure 5A:
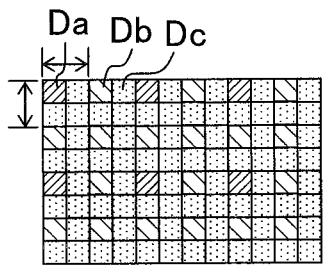
FIG. 5A to FIG. 5D are views showing one example of a way to thin out pixels in the case when printing is performed at a resolution corresponding to a half of that in image data of an original image and an enlargement rate is 200%.

Further, in the following explanation, as shown in FIG. 5A, the image data of the original image is set to be composed of pixels Da arranged at intervals of three pixels in an up and down direction and the right and left direction, (which are hatched pixels with narrow intervals between lines in the drawing), pixels Db being pixels arranged alternately in the up and down direction and the right and left direction except the pixels Da, (which are hatched pixels with wide intervals between lines in the drawing), and pixels Dc except the above, (which are dotted pixels in the drawing).

Figure 5B:
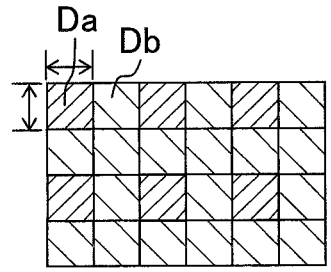

When printing is performed at a resolution corresponding to a half of that in the image data of the original image, at S103, by thinning out the pixels Dc of the pixels Da, Db, and Dc in the image data of the original image shown in FIG. 5A, the print data composed of the pixels Da and Db arranged alternately in the up and down direction and the right and left direction in the image data of the original image shown in FIG. 5B is generated. Note that in the above case, the number of pixels after the thinning out is a quarter of the number of pixels before the thinning out ($=(1/2)^2$) and the thinning-out rate Rt is 3/4 (75%). Then, the above thinning-out rate Rt corresponds to the predetermined thinning-out rate according to the present invention.

Further, at S105, when the enlargement rate Re is 200/100 (200%), the number of pixels Ns of the enlargement portion 31a is calculated by Nmax×(1−3/4)×(200/100)$^2$. Namely, the calculated number of pixels Ns is the number of pixels Nmax.

At this time, the calculated number of pixels Ns of the enlargement portion 31a becomes not more than the number of pixels Nmax (S106: YES), and thus at S107, by thinning out the pixels Dc of the pixels Da, Db, and Dc in the image data of the original image shown in FIG. 5A, the print data composed of the pixels Da and Db of the non-enlargement portion 31b shown in FIG. 5B is generated.

Figure 5C:
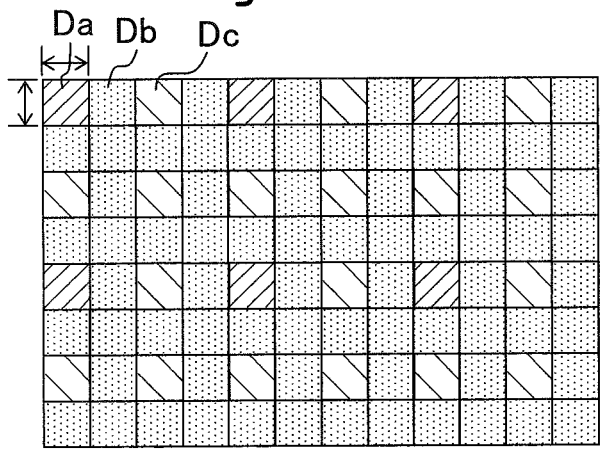

Further, at S108, without thinning out the pixels in the image data of the original image (by thinning out the pixels at a thinning-out rate smaller than the predetermined thinning-out rate, which is 0%), the print data composed of the pixels Da, Db, and Dc of the enlargement portion 31a shown in FIG. 5C is generated.

On the other hand, when the enlargement rate Re is 400/100 (400%), the number of pixels Ns of the enlargement portion 31a is calculated by Nmax×(1−3/4)×(400/100)$^2$. Namely, the calculated number of pixels Ns is four times as much as the number of pixels Nmax. Accordingly, the number of pixels Ns exceeds the number of pixels Nmax.

At this time, the calculated number of pixels of the enlargement portion 31a is greater than the number of pixels Nmax (S106: NO), and thus at S109, by thinning out the pixels Db and Dc of the pixels Da, Db, and Dc in the image data of the original image shown in FIG. 6A, the print data of the non-enlargement portion 31b, which is composed of the pixels Da arranged at intervals of three pixels in the up and down direction and the right and left direction in the image data of the original image shown in FIG. 6B, is generated. Note that in the above case, the number of pixels after the thinning out is a sixteenth ($=(1/4)^2$) of the number of pixels before the thinning out, and the thinning-out rate is 93.75% ($=(15/16)\times 100\%$). Then, the above thinning-out rate is greater than the predetermined thinning-out rate of 75%. Namely, the print data generating section 47 thins out the number of pixels of the non-enlargement portion 31b based on a third thinning-out rate (93.75%) which is greater than the first thinning-out rate (75%).

Further, at S110, without thinning out the pixels in the image data of the original image (by thinning out the pixels at a thinning-out rate smaller than the predetermined thinning-out rate, which is 0%), the print data composed of the pixels Da, Db, and Dc of the enlargement portion 31a shown in FIG. 6C is generated.

Figure 7A:
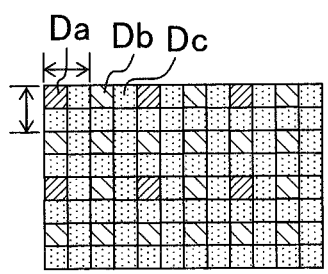
FIG. 7A to FIG. 7D are views showing one example of a way to thin out pixels in the case when printing is performed at a resolution corresponding to a quarter of that in the image data of the original image and the enlargement rate is 200%.
Figure 7B:
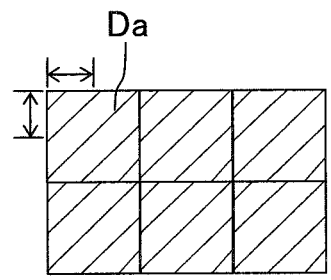

Further, when printing is performed at a resolution corresponding to a quarter of that in the image data of the original image, at S103, by thinning out the pixels Db and Dc of the pixels Da, Db, and Dc in the image data of the original image shown in FIG. 7A similar to those in FIG. 5A, the print data composed of the pixels Da arranged at intervals of three pixels in the up and down direction and the right and left direction shown in FIG. 7B is generated. Note that in the above case, the number of pixels obtained after the pixels are thinned out is a sixteenth of the number of pixels obtained before the pixels are thinned out, and the thinning-out rate Rt is 15/16 (93.75%). Then, the above thinning-out rate Rt corresponds to the predetermined thinning-out rate according to the present invention.

Further, at S105, when the enlargement rate Re is 200/100 (200%), the number of pixels Ns of the enlargement portion 31a is calculated by Nmax×(1−15/16)×(200/100)$^2$. Namely, the calculated number of pixels Ns is a quarter of the number of pixels Nmax.

On the other hand, when the enlargement rate Re is 400/100 (400%), the number of pixels Ns of the enlargement portion 31a is calculated by Nmax×(1−15/16)×(400/100)$^2$. Namely, the calculated number of pixels Ns is the same as the number of pixels Nmax.

As described above, in the above case, even when the enlargement rate is either 200% or 400%, the number of pixels Ns of the enlargement portion 31a to be calculated becomes equal to or less than the number of pixels Nmax (S106: YES).

Figure 7C:
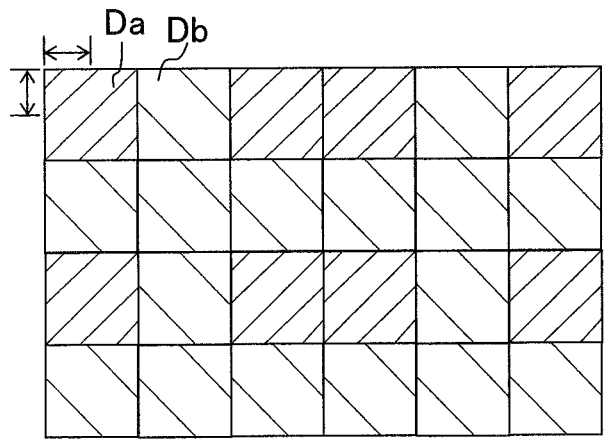

Accordingly, when the enlargement rate is 200%, at S107, by thinning out the pixels Db and Dc of the pixels Da, Db, and Dc in the image data of the original image shown in FIG. 7A (at the predetermined thinning-out rate), the print data composed of the pixels Da of the non-enlargement portion 31b as shown in FIG. 7B is generated. Then, at S108, by thinning out the pixels Dc of the pixels Da, Db, and Dc in the image data of the original image (at a thinning-out rate smaller than the predetermined thinning-out rate), the print data composed of the pixels Da and Db of the enlargement portion 31a as shown in FIG. 7C is generated.

On the other hand, when the enlargement rate is 400%, at S107, by thinning out the pixels Db and Dc of the pixels Da, Db, and Dc in the image data of the original image shown in FIG. 8A similar to those in FIG. 7A (at the predetermined thinning-out rate), the print data composed of the pixels Da of the non-enlargement portion 31b as shown in FIG. 8B is generated. Further, at S108, without thinning out the pixels in the image data of the original image (by thinning out the pixels at a thinning-out rate smaller than the predetermined thinning-out rate, which is 0%), the print data composed of the pixels Da, Db, and Dc of the enlargement portion 31a as shown in FIG. 8C is generated.

Here, in this embodiment, when the print data is generated by thinning out the pixels in the image data of the original image, the thinning-out rate of the pixels in the enlargement portion 31a is smaller than that in the non-enlargement portion 31b, but it is also possible to consider that the thinning-out rate in the enlargement portion 31a and the thinning-out rate in the non-enlargement portion 31b are set to be the same. Then, in the above case, regardless of the enlargement portion 31a and the non-enlargement portion 31b, it is only necessary to perform uniform processing for the image data of the original image in generating the print data, and thus generating processing of the print data is simplified.

However, in the above case, difference in resolution occurs between the enlargement portion 31a and the non-enlargement portion 31b in the composite image 31 printed based on the generated print data, resulting that difference in image quality occurs between the enlargement portion 31a and the non-enlargement portion 31b.

Figure 5D:
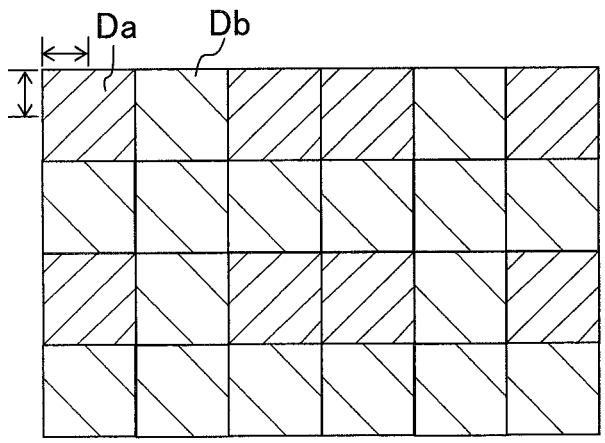
Figure 7D:
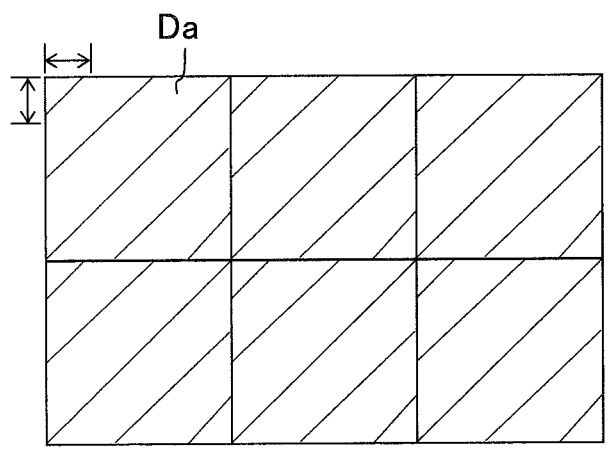

In the above-described concrete examples, in the case of the enlargement rate being 200%, the thinning-out rate in the enlargement portion 31a and the thinning-out rate in the non-enlargement portion 31b are set to be the same, and by thinning out only the pixels Dc, the print data of the enlargement portion 31a and the non-enlargement portion 31b are generated, and thereby as descried above, the print data of the non-enlargement portion 31b as shown in FIG. 5B and FIG. 7B is obtained, and on the other hand, the print data of the enlargement portion 31a as shown in FIG. 5D and FIG. 7D is obtained. As a result, as can be seen by comparing FIG. 5B and FIG. 5D and FIG. 7B and FIG. 7D respectively, in the printed composite image 31, the number of pixels (the resolution) in a section of length in the enlargement portion 31a results in a half of that in the non-enlargement portion 31b.

In contrast, this embodiment is constituted in a manner that, as described at S107 and S108, the thinning-out rate in the non-enlargement portion 31b is set to be the predetermined thinning-out rate and the thinning-out rate in the enlargement portion 31a is set to be smaller than the predetermined thinning-out rate, and thereby the number of pixels Ns in the enlargement portion 31a becomes the number obtained after the number of pixels obtained in the case when the thinning-out rate in the enlargement portion 31a is set to be the predetermined thinning-out rate is multiplied by a value obtained by squaring the enlargement rate, and thus in the composite image 31 to be printed, the enlargement portion 31a and the non-enlargement portion 31b become the same in resolution (the difference in resolution between the enlargement portion 31a and the non-enlargement portion 31b is thinned out), and the difference in image quality does not occur between the enlargement portion 31a and the non-enlargement portion 31b.

In the above-described concrete examples, when the enlargement rate is 200%, the print data of the enlargement portion 31a as shown in FIG. 5C and FIG. 7C is obtained as described above. As can be seen by comparing FIG. 5B and FIG. 5C and FIG. 7B and FIG. 7C respectively, in the printed composite image 31, the enlargement portion 31a and the non-enlargement portion 31b become the same in resolution.

Further, if the thinning-out rate of the enlargement portion 31a is the same, the larger the enlargement rate of the enlargement portion 31a is, the smaller the resolution of the enlargement portion 31a becomes. However, this embodiment is constituted in a manner that as the enlargement rate becomes larger, the thinning-out rate in the enlargement portion 31a is thinned out and the number of pixels in the enlargement portion 31a is increased, and thus it is possible to prevent the difference in resolution between the enlargement portion 31a and the non-enlargement portion 31b from being increased.

In the above-described concrete examples, in the case of the enlargement rate being 200%, the print data of the enlargement portion 31a as shown in FIG. 7C is obtained as described above, and in the case of the enlargement rate being 400%, the print data of the enlargement portion 31a as shown in FIG. 8C is obtained, resulting that the larger the enlargement rate becomes, the smaller the thinning-out rate in the enlargement portion 31a becomes. Thus, as can be seen by comparing FIG. 7B and FIG. 7C and FIG. 8B and FIG. 8C respectively, in the composite image 31 to be printed, the enlargement portion 31a and the non-enlargement portion 31b are the same in resolution.

Further, when the number of pixels Ns of the enlargement portion 31a calculated at S105 exceeds the number of pixels Nmax of the portion corresponding to the enlargement portion 31a of the original image, it is practically not possible to set the number of pixels of the enlargement portion 31a to be the calculated number of pixels Ns. Thus, as described at S110, the print data of the enlargement portion 31a is generated without thinning out the pixels in the image data of the original image so that the resolution of the enlargement portion 31a becomes the highest.

However, in the above case, when the print data of the non-enlargement portion 31b is generated by thinning out the pixels in the image data of the original image at the predetermined thinning-out rate, the difference in resolution occurs between the enlargement portion 31a and the non-enlargement portion 31b, resulting that the significant difference in image quality occurs between the enlargement portion 31a and the non-enlargement portion 31b.

In the above-described concrete examples, in the case when printing is performed at a resolution corresponding to a half of that in the image data of the original image and the enlargement rate of the enlargement portion 31a is 400%, the number of pixels Ns of the enlargement portion 31a calculated at S105 exceeds the number of pixels Nmax of the portion corresponding to the enlargement portion 31a of the original image. At this time, when the print data of the enlargement portion 31a is generated without thinning out the pixels in the image data of the original image, the print data composed of the pixels Da, Db, and Dc as shown in FIG. 8C is obtained.

On the other hand, when the print data of the non-enlargement portion 31b is generated by thinning out the pixels in the image data of the original image at the predetermined thinning-out rate (75%), the print data composed of the pixels Da and Db as shown in FIG. 5B is obtained. Then, as can be seen by comparing FIG. 5B and FIG. 8C, in the printed composite image 31, the number of pixels (the resolution) in a section of length in the enlargement portion 31a results in a half of that in the non-enlargement portion 31b.

In contrast, in this embodiment, as described at S109 and S110, the number of pixels of the non-enlargement portion 31b is thinned out by thinning out the pixels in the image data of the original image at a thinning-out rate larger than the predetermined thinning-out rate. Thus, although the resolution of the non-enlargement portion 31b is lowered in the composite image 31 to be printed, the difference in resolution between the enlargement portion 31a and the non-enlargement portion 31b is thinned out.

In the above-described concrete examples, the number of pixels of the non-enlargement portion 31b is further thinned out by thinning out the pixels (pixels Db and Dc) in the image data of the original image at a thinning-out rate being 93.75% larger than the above-described predetermined thinning-out rate (75%), so that as for the print data of the non-enlargement portion 31b to be generated, the print data composed of the pixels Da as shown in FIG. 8B is obtained. Then, as can be seen by comparing FIG. 8B and FIG. 8C, in the printed composite image 31, the resolution of the non-enlargement portion 31b results in a half of that in the case when the thinning-out rate in the non-enlargement portion 31b is the predetermined thinning-out rate, but the enlargement portion 31a and the non-enlargement portion 31b become the same in resolution.

Incidentally, this embodiment is not limited to the above-described concrete examples, and the enlargement rate and the ratio of the resolution in the image data of the original image to the resolution in the image to be printed can be changed appropriately, and in the above case, it is only necessary to change the thinning-out rate appropriately according to the enlargement rate and the ratio of the above-described resolutions.

Next, a modified example in which various modifications are added to this embodiment will be explained. However, components having the constitutions similar to those of this embodiment will be denoted by the same reference numerals and symbols, and explanation thereof is omitted when convenient.

In the above-described embodiment, when the number of pixels Ns of the enlargement portion 31a calculated at S105 exceeds the number of pixels Nmax, the print data of the non-enlargement portion 31b is generated by thinning out the pixels in the image data of the original image at a thinning-out rate larger than the predetermined thinning-out rate, but the print data of the non-enlargement portion 31b may also be generated by thinning out the pixels in the image data of the original image at the predetermined thinning-out rate.

In the above case, the difference in resolution occurs between the enlargement portion 31a and the non-enlargement portion 31b as described above, but the difference in resolution between the enlargement portion 31a and the non-enlargement portion 31b is thinned out when compared with the difference in resolution in the case when the thinning-out rate in the enlargement portion 31a and the thinning-out rate in the non-enlargement portion 31b are the same.

In the above-described concrete examples, when printing is performed at a resolution corresponding to a half of that in the image data of the original image, in which the number of pixels Ns calculated at S105 exceeds the number of pixels Nmax, and the enlargement rate of the enlargement portion 31a is 400%, as described above, the print data of the enlargement portion 31a as shown in FIG. 6C is obtained, and as for the print data of the non-enlargement portion 31b generated by thinning out the pixels (pixels Dc) in the image data of the original image at the predetermined thinning-out rate (75%), the print data composed of the pixels Da and Db as shown in FIG. 5B is obtained. Then, in the above case, as can be seen by comparing FIG. 6C and FIG. 5B, the resolution in the enlargement portion 31a results in a half of that in the non-enlargement portion 31b.

Figure 9:
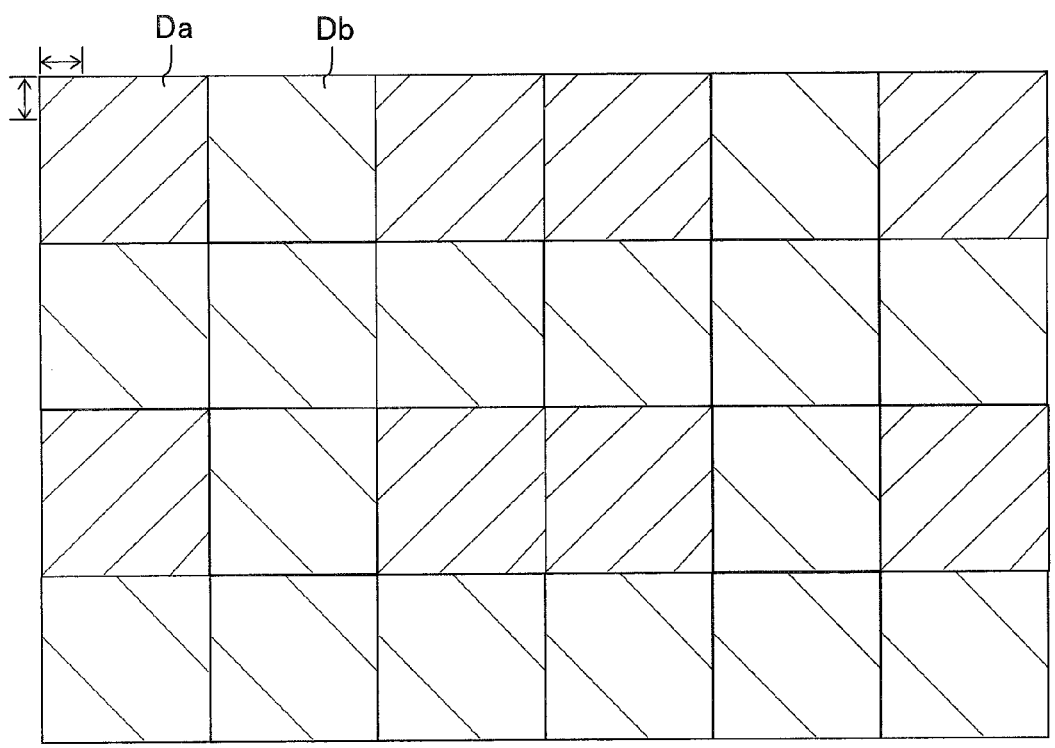
FIG. 9 is a view corresponding to FIG. 7C in the case when a thinning-out rate in an enlargement portion is set the same as that in a non-enlargement portion in the example in FIG. 7A to FIG. 7D.
Figure 10:
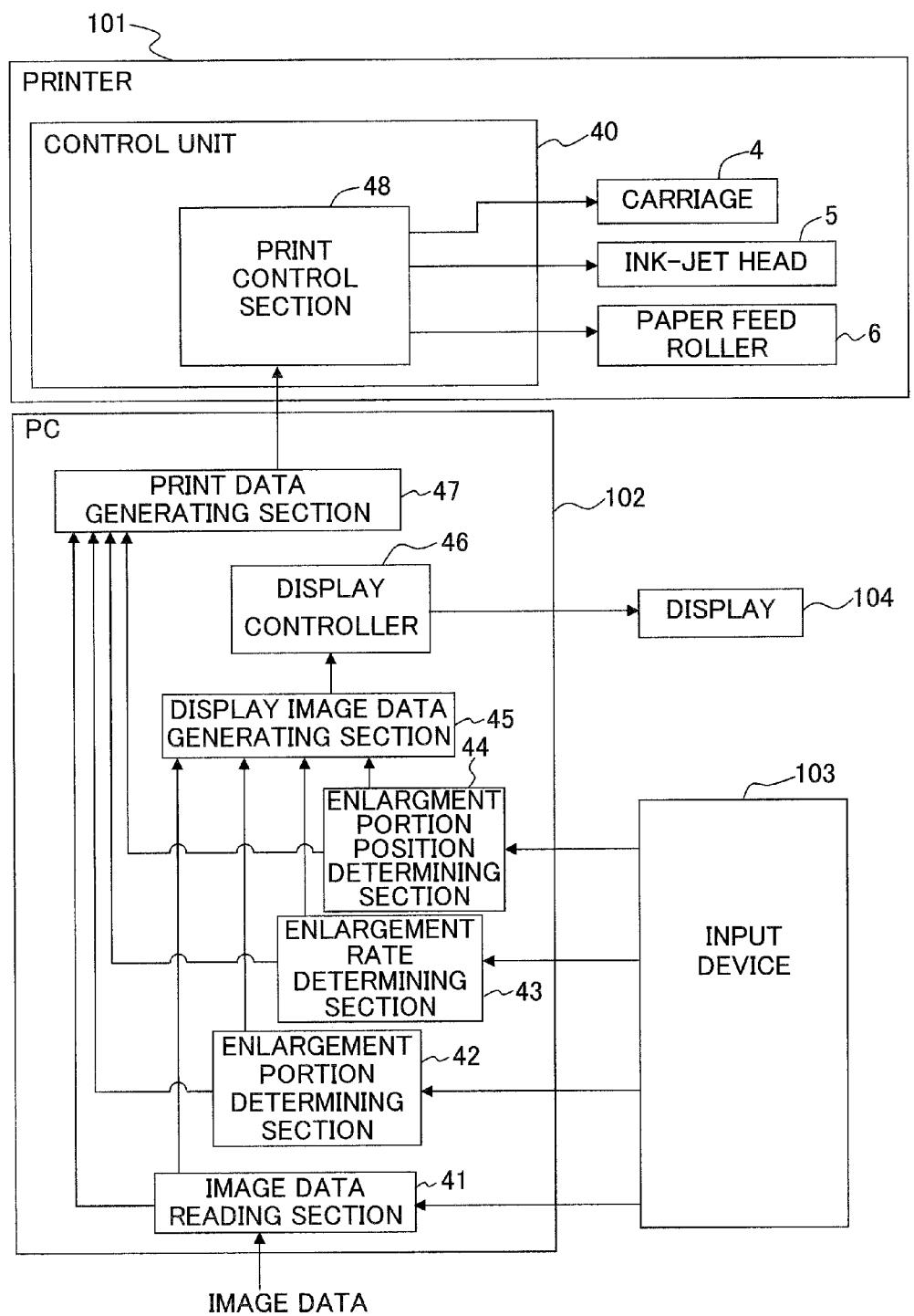
FIG. 10 is a functional block diagram of a printing system in a modified example 1.

In contrast, when the print data of the enlargement portion 31a is generated by thinning out the pixels (pixels Dc) in the image data of the original image at the predetermined thinning-out rate (75%), the print data composed of the pixels Da and Db as shown in FIG. 9 is obtained. Then, in the above case, as can be seen by comparing FIG. 9 and FIG. 5B, the resolution in the enlargement portion 31a results in a quarter of that in the non-enlargement portion 31b, and the difference in resolution between the enlargement portion 31a and the non-enlargement portion 31b is further increased.

Further, in the above-described embodiment, at S108, the print data of the enlargement portion 31a is generated by thinning out the pixels in the image data of the original image at a thinning-out rate such that the number of pixels in the print data of the enlargement portion 31a becomes the number of pixels Ns calculated at S105, but the thinning-out rate in the enlargement portion 31a is not limited to the above and is only necessary to be smaller than the thinning-out rate in the non-enlargement portion 31b.

In the above case as well, the difference in resolution occurs between the enlargement portion 31a and the non-enlargement portion 31b, but the difference in resolution between the enlargement portion 31a and the non-enlargement portion 31b in the composite image 31 to be printed is thinned out when compared with the difference in resolution in the case when the thinning-out rate in the enlargement portion 31a and the thinning-out rate in the non-enlargement portion 31b are the same.

Further, the above-described embodiment is constituted in a manner that the larger the enlargement rate in the enlargement portion 31a is, the smaller the thinning-out rate in the enlargement portion 31a becomes, but as long as the thinning-out rate in the enlargement portion 31a is smaller than that in the non-enlargement portion 31b, the thinning-out rate in the enlargement portion 31a may also be uniform regardless of the enlargement rate.

In the above case as well, the difference in resolution occurs between the enlargement portion 31a and the non-enlargement portion 31b, but the difference in resolution between the enlargement portion 31a and the non-enlargement portion 31b in the composite image 31 to be printed is thinned out when compared with the difference in resolution in the case when the thinning-out rate in the enlargement portion 31a and the thinning-out rate in the non-enlargement portion 31b are the same.

Further, in the above-described embodiment, by the operations performed on the touch panel 7, or the like, the reading of the image data of the original image, the determinations of the range to be the enlargement portion 31a, the enlargement rate, and the position where the enlargement portion is placed, the generation of the print data, and so on are all performed in the printer 1, but the present invention is not limited to the above.

In one modified example (a modified example 1), a PC 102 is connected to a printer 101. Note that in the modified example 1, the combination of the printer 101 and the PC 102 corresponds to a printing system according to the present invention, and the PC 102 corresponds to a print data generating apparatus according to the present invention.

The printer 101 differs from the above-described printer 1 (see FIG. 3) only on the points that the printer 101 does not include a touch panel 7 and a control device 40 does not include an image data reading section 41, an enlargement portion determining section 42, an enlargement rate determining section 43, an enlargement portion position determining section 44, a display image data generating section 45, a display control section 46, and a print data generating section 47, but as for other parts, the printer 101 has constitutions similar to those of the printer 1.

The PC 102 includes an image data reading section 41, an enlargement portion determining section 42, an enlargement rate determining section 43, an enlargement portion position determining section 44, a display image data generating section 45, a display control section 46, and a print data generating section 47. But the image data reading section 41, the enlargement portion determining section 42, the enlargement rate determining section 43 and the enlargement portion position determining section 44 act by receiving operations performed by not the touch panel 7 (see FIG. 3) provided on the printer 1 but an input device 103 connected to the PC 102, which is a keyboard, a mouse, or the like, and the display image data generating section 45 generates image data of a display image to be displayed on a display 104 connected to the PC 102 externally, and the display control section 46 controls the display 104 so that an image similar to that displayed on the display screen 19a of the touch panel 7 in the printer 1 is displayed on a screen of the display 104.

Then, in the above case, print data generated in the print data generating section 47 in the PC 102 is transferred to the printer 101 from the PC 102, and a print control section 48 in the printer 101 controls a carriage 4, an ink-jet head 5, and a paper feed roller 6 so that an image corresponding to the received print data is printed.

Further, in the modified example 1, the PC 102 includes all of the image data reading section 41, the enlargement portion determining section 42, the enlargement rate determining section 43, and the enlargement portion position determining section 44, but the present invention is not limited to the above. For example, the control device 40 in the printer 101 includes only the print data generating section 47 of these components and the PC 102 includes the components except the above, or the like, namely, the present invention may also be constituted in a manner that the printer 101 includes one of these components and the PC 102 includes the remaining components.

Further, in the foregoing, an example where the present invention is applied to an ink-jet printer having what is called a serial head is explained, but the present invention is not limited to the above, and it is also possible to apply the present invention to an ink-jet printer having what is called a line head, or a printing system including the ink-jet printer as above. Furthermore, it is also possible to apply the present invention to a printing apparatus except the ink-jet printer such as a laser printer, or a printing system including the printing apparatus as above.

What is claimed is:

1. A printing apparatus which prints a composite image formed of an enlargement portion and a non-enlargement portion of an original image on a printing medium, the printing apparatus comprising:
    an enlargement portion determining section which determines the enlargement portion, of the original image, which is to be enlarged in the composite image;
    an enlargement rate determining section which determines an enlargement rate of the enlargement portion with respect to the original image;
    a print data generating section which generates print data for printing the composite image based on image data of the original image, the enlargement portion determined by the enlargement portion determining section, and the enlargement rate determined by the enlargement rate determining section; and
    a printing mechanism which prints the composite image on the printing medium based on the print data generated by the print data generating section,
        wherein the print data generating section thins out the number of pixels of the non-enlargement portion based on a first thinning-out rate and thins out the number of pixels of the enlargement portion based on a second thinning-out rate which is smaller than the first thinning-out rate to generate the print data;
        wherein the print data generating section makes the second thinning-out rate smaller as the enlargement rate determining section determines the enlargement rate to be greater;
        wherein the print data generating section calculates the number of pixels of the enlargement portion by multiplying the number of pixels of the image data of the original image corresponding to the enlargement portion, which is obtained by thinning out the number of pixels of the enlargement portion based on the first thinning-out rate, by a value which is obtained by squaring the enlargement rate.

2. The printing apparatus according to claim 1,
    wherein when the number of pixels of the enlargement portion calculated by the print data generating section exceeds the number of pixels in a portion corresponding to the enlargement portion in the image data of the original image, the print data generating section thins out the number of pixels of the non-enlargement portion based on a third thinning-out rate which is greater than the first thinning-out rate, and thins out the number of pixels of the portion corresponding to the enlargement portion in the image data of the original image so that the number of pixels of the enlargement portion does not exceed the number of pixels of the portion corresponding to the enlargement portion in the image data of the original image.

3. A print data generating apparatus which generates print data of a composite image formed of an enlargement portion and a non-enlargement portion of an original image to be printed on a printing medium, the apparatus comprising:
    an enlargement portion determining section which determines the enlargement portion, of the original image, which is to be enlarged in the composite image;
    an enlargement rate determining section which determines an enlargement rate of the enlargement portion with respect to the original image;
    a print data generating section which generates print data for printing the composite image based on image data of the original image, the enlargement portion determined by the enlargement portion determining section, and the enlargement rate determined by the enlargement rate determining section,
        wherein the print data generating section generates the print data by thinning out the number of pixels of the non-enlargement portion based on a first thinning-out rate and by thinning out the number of pixels of the enlargement portion based on a second thinning-out rate which is smaller than the first thinning-out rate;

wherein the print data generating section makes the second thinning-out rate smaller as the enlargement rate determining section determines the enlargement rate to be greater;

wherein the print data generating section calculates the number of pixels of the enlargement portion by multiplying the number of pixels of the image data of the original image corresponding to the enlargement portion, which is obtained by thinning out the number of pixels of the enlargement portion based on the first thinning-out rate, by a value which is obtained by squaring the enlargement rate.

4. A non-transitory computer readable medium storing a print data generating program for generating print data of a composite image formed of an enlargement portion and a non-enlargement portion of an original image to be printed on a printing medium, the program comprising:

an enlargement portion determining step for determining an enlargement portion, of the original image, which is to be enlarged in the composite image;

an enlargement rate determining step for determining an enlargement rate of the enlargement portion with respect to the original image; and a print data generating step for generating print data for printing the composite image based on image data of the original image, the enlargement portion determined in the enlargement portion determining step, and the enlargement rate determined in the enlargement rate determining step, wherein in the print data generating step, the print data is generated by thinning out the number of pixels of the non-enlargement portion based on a first thinning-out rate and by thinning out the number of pixels of the enlargement portion based on a second thinning-out rate which is smaller than the first thinning-out rate;

wherein in the print data generating step, the second thinning-out rate is decreased as the enlargement rate is determined to be greater in the enlargement rate determining step;

wherein in the print data generating step, the number of the pixels of the enlargement portion is calculated by multiplying the number of pixels of the image data of the original image corresponding to the enlargement portion, which is obtained by thinning out the number of pixels of the enlargement portion based on the first thinning-out rate, by a value which is obtained by squaring the enlargement rate determined in the enlargement rate determining step.

* * * * *